United States Patent
Yuan et al.

(10) Patent No.: US 12,518,434 B2
(45) Date of Patent: Jan. 6, 2026

(54) POINT CLOUD DECODING METHOD, POINT CLOUD ENCODING METHOD, AND DECODER

(71) Applicant: GUANGDONG OPPO MOBILE TELECOMMUNICATIONS CORP., LTD., Guangdong (CN)

(72) Inventors: Hui Yuan, Guangdong (CN); Lu Wang, Guangdong (CN); Xiaohui Wang, Guangdong (CN); Qi Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 238 days.

(21) Appl. No.: 18/335,714

(22) Filed: Jun. 15, 2023

(65) Prior Publication Data
US 2023/0326090 A1    Oct. 12, 2023

Related U.S. Application Data

(63) Continuation of application No. PCT/CN2020/138435, filed on Dec. 22, 2020.

(51) Int. Cl.
G06T 17/00        (2006.01)
G06T 9/40         (2006.01)

(52) U.S. Cl.
CPC .............. *G06T 9/40* (2013.01); *G06T 17/00* (2013.01); *G06T 2210/36* (2013.01)

(58) Field of Classification Search
CPC ....... G06T 2210/36; G06T 2207/10028; G06T 9/00; G06T 9/004; G06T 9/40;
(Continued)

(56) References Cited

U.S. PATENT DOCUMENTS

2018/0220160 A1*  8/2018  Lu .................. H04N 19/174
2019/0087979 A1   3/2019  Mammou et al.
(Continued)

FOREIGN PATENT DOCUMENTS

CN    110418135    11/2019
CN    110708560    1/2020
(Continued)

OTHER PUBLICATIONS

IPI, Office Action for IN Application No. 202317048320, Jan. 21, 2025.
(Continued)

*Primary Examiner* — Hau H Nguyen
(74) *Attorney, Agent, or Firm* — Hodgson Russ LLP

(57) ABSTRACT

A point cloud decoding method, a point cloud encoding method, and a decoder are provided in implementation of the disclosure. The decoding method includes the following. A bitstream of a point cloud is parsed to obtain an initial reconstructed value of attribute information of a target point in the point cloud. The initial reconstructed value is converted into an initial luma value and an initial chroma value. A final chroma value is obtained by filtering the initial chroma value with a Kalman filtering algorithm. A final reconstructed value of the attribute information of the target point is obtained based on the final chroma value and the initial luma value. A decoded point cloud is obtained according to the final reconstructed value of the attribute information of the target point.

17 Claims, 8 Drawing Sheets

(58) Field of Classification Search
CPC ....... G06T 17/00; G06T 9/001; H04N 19/117; H04N 19/186; H04N 19/105
See application file for complete search history.

(56) References Cited

U.S. PATENT DOCUMENTS

| | | |
|---|---|---|
| 2019/0311499 A1 | 10/2019 | Mammou et al. |
| 2021/0142521 A1 | 5/2021 | Iguchi et al. |
| 2022/0319053 A1* | 10/2022 | Oh .................. H04N 21/816 |
| 2023/0196625 A1 | 6/2023 | Li et al. |

FOREIGN PATENT DOCUMENTS

| | | |
|---|---|---|
| CN | 110996098 | 4/2020 |
| CN | 111095929 | 5/2020 |
| CN | 111145090 | 5/2020 |
| CN | 111242997 | 6/2020 |
| CN | 111327897 | 6/2020 |
| WO | 2020075781 | 4/2020 |
| WO | 2020138463 | 7/2020 |
| WO | 2020145143 | 7/2020 |
| WO | 2020146539 | 7/2020 |
| WO | 2020189709 | 9/2020 |

OTHER PUBLICATIONS

WIPO, International Search Report and Written Opinion for International Application No. PCT/CN2020/138435, Sep. 26, 2021.
EPO, Extended European Search Report for EP Application No. 20966335.0, Feb. 5, 2024.
JPO, Office Action for JP Application No. 2023-537455, Aug. 16, 2024.

* cited by examiner

POINT CLOUD DECODING METHOD, POINT CLOUD ENCODING METHOD, AND DECODER

CROSS-REFERENCE TO RELATED APPLICATION(S)

This application is a continuation of International Application No. PCT/CN2020/138435, filed Dec. 22, 2020, the entire disclosure of which is incorporated herein by reference.

TECHNICAL FIELD

This disclosure relates to the field of point cloud coding, in particular to a point cloud decoding method, a point cloud encoding method, and a decoder.

BACKGROUND

Point clouds have begun to spread to various fields, such as virtual/augmented reality, robotics, geographic information system, medical field, etc. With the continuous improvement of accuracy and speed of scanning devices, a large point cloud on a surface of an object can be accurately obtained, and hundreds of thousands of points can be obtained in one scene. Such a large number of points brings a challenge for computer storage and transmission. Therefore, compression of points becomes a hot issue.

For the compression of the point cloud, position information and color information of the point cloud are mainly compressed. Specifically, octree encoding is performed on the position information of the point cloud, the color information is predicted according to the position information after the octree encoding, and then the color information is encoded by making a difference with original color information, to achieve encoding of the point cloud.

For now, how to improve prediction effect in the process of predicting the color information of the point is a technical problem to be solved in the field.

SUMMARY

In an aspect, a point cloud decoding method is provided. The decoding method includes the following. A bitstream of a point cloud is parsed to obtain an initial reconstructed value of attribute information of a target point in the point cloud. The initial reconstructed value is converted into an initial luma value and an initial chroma value. A final chroma value is obtained by filtering the initial chroma value with a Kalman filtering algorithm. A final reconstructed value of the attribute information of the target point is obtained based on the final chroma value and the initial luma value. A decoded point cloud is obtained according to the final reconstructed value of the attribute information of the target point.

In another aspect, a point cloud encoding method is provided. The encoding method includes the following. Position information of a target point in a point cloud is processed to obtain reconstruction information of the position information of the target point. A predicted value of attribute information of the target point is obtained according to the reconstruction information of the position information of the target point. The attribute information of the target point in the point cloud is processed to obtain an actual value of the attribute information of the target point. A residual value of the attribute information of the target point is obtained according to the predicted value of the attribute information of the target point and the actual value of the attribute information of the target point. A bitstream is obtained by encoding the number of residual values of attribute information of points in lossless encoding and the residual value of the attribute information of the target point that require to be signalled into the bitstream.

In another aspect, a decoder is provided. The decoder includes at least one processor and a memory. The memory is coupled to the at least one processor and stores at least one computer executable instruction thereon. When executed by the at least one processor, the at least one computer executable instruction causes the at least one processor to: parse a bitstream of a point cloud to obtain an initial reconstructed value of attribute information of a target point in the point cloud; convert the initial reconstructed value into an initial luma value and an initial chroma value; obtain a final chroma value by filtering the initial chroma value with a Kalman filtering algorithm; obtain, based on the final chroma value and the initial luma value, a final reconstructed value of the attribute information of the target point; and obtain a decoded point cloud according to the final reconstructed value of the attribute information of the target point.

DETAILED DESCRIPTION

Figure 1:
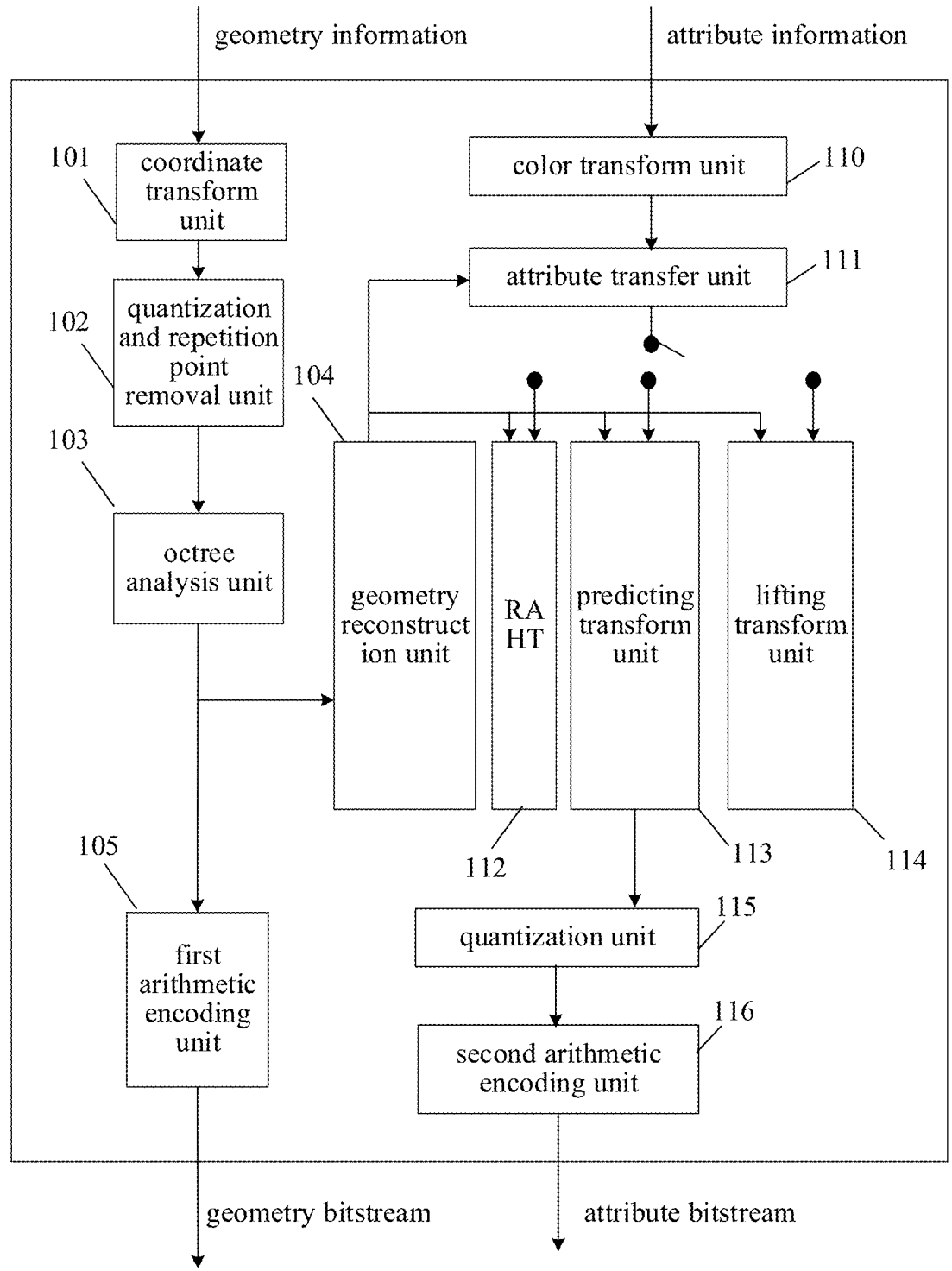
FIG. 1 is a schematic block diagram of an encoding framework provided in implementations of the disclosure.

The following describes the concept related to a point cloud.

The point cloud is a set of discrete points irregularly distributed in space that express a spatial structure and surface attribution of a three-dimensional (3D) object or a 3D scene.

The point cloud data is a specific recording form of the point cloud, and point cloud data of each point in the point cloud can include geometry information and attribute information. For each point in the point cloud, the geometry information of the point refers to Cartesian 3D coordinate data of the point, and the attribute information of the point can include, but not limited to, at least one of: color information, material information, laser reflectance information. The color information can be information on any color space. For example, the color information can be red-green-blue (RGB) information. For another example, the color information can be luma-chroma (YCbCr, YUV) information. Y denotes luma, Cb (U) denotes blue chroma, Cr (V) denotes red chroma, U and V each denote chroma, where chroma is used to describe color difference information.

Each point in the point cloud has the same amount of attribute information. In an example, each point in the point cloud has two types of attribute information: color information and laser reflectance information. In another example, each point in the point cloud has three types of attribute information: color information, material information, and laser reflectance information. In an encapsulation process of point cloud media, the geometry information of the point may also be called the geometry weight or geometry component of the point cloud media, and the attribute information of the point may also be called the attribute weight or attribute component of the point cloud media. The point cloud media may include one geometry component and one or more attribute components.

Based on the implementation scene, the point cloud may include two types: machine-perceived point cloud and human-eye-perceived point cloud. Implementation scenes of the machine-perceived point cloud include, but are not limited to: autonomous navigation system, real-time inspection system, geographic information system, visual sorting robot, rescue and disaster relief robot, and other point cloud implementation scenes. Implementation scenes of the human-eye-perceived point cloud include, but are not limited to: digital cultural heritage, free viewpoint broadcasting, three-dimensional immersion communication, three-dimensional immersion interaction, and other point cloud implementation scenes. The way to obtain the point cloud includes, but is not limited to: computer generation, 3D laser scanning, 3D photographic measurement, and the like. A computer may generate a point cloud of a virtual three-dimensional object and scene. 3D scanning may obtain a point cloud of a static real-world three-dimensional object or scene, and may obtain a point cloud in million level per second. 3D cameras may obtain a point cloud of a dynamic real-world three-dimensional object or scene, and may obtain a point cloud in tens of millions level per second. In some embodiments, a point cloud on a surface of an object may be collected through photovoltaic radar, laser radar, laser scanner, multi-view camera, or other collection devices. A point cloud obtained according to a laser measurement principle may include three-dimensional coordinate information of the point and laser reflectance of the point. A point cloud obtained according to the photographic measurement principle may include three-dimensional coordinate information of the point and color information of the point. The point cloud obtained according to a combination of the laser measurement principle and the photographic measurement principle may include the three-dimensional coordinate information of the point, the laser reflectance of the point, and the color information of the point. Accordingly, the point cloud may alternatively include three types based on the acquisition way of the point cloud, that is, a first static point cloud, a second type of dynamic point cloud, and a third type of dynamically-acquired point cloud. For the first static point cloud, the object is stationary, and the device for acquiring the point cloud is also stationary. For the second type of dynamic point cloud, the object is moving, but the device for acquiring the point cloud is stationary. For the third type of dynamically-acquired point cloud, the device for acquiring the point cloud is moving.

For example, in the medical field, a point cloud of biological tissue organs may be obtained through magnetic resonance imaging (MRI), computed tomography (CT), and electromagnetic localization information. These technologies reduce the point cloud acquisition cost and time cycle, and increase the data accuracy. The change in the acquisition manner of the point cloud makes it possible to acquire a large point cloud. With the accumulation of large-scale point cloud, efficient storage, transmission, publishing, sharing, and standardization of the point cloud become the key of application of the point cloud.

The point cloud data may be used to form the point cloud media, and the point cloud media may be a media file. The point cloud media may include multiple media frames, and each media framework in the point cloud media consists of point cloud data. The point cloud media is widely used as it can express a spatial structure and surface attribute of a three-dimensional object or a three-dimensional scene in a flexible and convenient way. After encoding the point cloud media, an encoded bitstream may be encapsulated into an encapsulated file, which may be used for transmission to the user. Accordingly, at a point cloud media player terminal, the encapsulated file may be de-capsulated and is decoded, and finally decoded data flow is presented. The encapsulated file may also be called a point cloud file.

For now, the point cloud may be encoded through a point cloud encoding framework.

The point cloud encoding framework may be a geometry point cloud compression (G-PCC) encoding and decoding framework or a video point cloud compression (V-PCC) encoding and decoding framework provided by the moving picture experts group (MPEG), or may be an AVS-PCC encoding and decoding framework provided by the audio video standard (AVS). The G-PCC encoding and decoding framework may be used for compression for the first static point cloud and the third type of dynamically-acquired point cloud, and the V-PCC encoding and decoding framework may be used for compression for the second type of dynamic point cloud. The G-PCC encoding and decoding framework is also called a point cloud codec TMC13, and the V-PCC encoding and decoding framework is also called a point cloud codec TMC2. An encoding and decoding framework applicable to implementations of the disclosure is described below in terms of the G-PCC encoding and decoding framework.

FIG. 1 is a schematic block diagram of an encoding framework 100 provided in implementations of the disclosure.

As illustrated in FIG. 1, the encoding framework 100 can obtain position information and attribute information of a point cloud from an acquisition device. The encoding of the point cloud includes position encoding and attribute encoding. In one implementation, the process of position encoding includes: performing preprocessing such as coordinate transformation and quantization and removal of repetition points on the original point cloud, and performing encoding after constructing an octree, to form a geometry bitstream. The process of attribute encoding includes: by giving reconstructed information of position information and actual values of attribute information of the input point cloud, selecting one of three prediction modes for point cloud prediction, quantizing the predicted result, and performing arithmetic encoding, to form an attribute bitstream.

As illustrated in FIG. 1, the position encoding can be achieved with the following units: a coordinate transform unit 101, a quantization and repetition point removal unit 102, an octree analysis unit 103, a geometry reconstruction unit 104, and a first arithmetic encoding unit 105.

The coordinate transform unit 101 can be used to transform world coordinates of points in the point cloud to relative coordinates. For example, the minimum values of coordinate axes x, y, and z are respectively subtracted from geometry coordinates of the point, which is equivalent to a de-direct current operation, to transform world coordinates of the point in the point cloud from world coordinates to relative coordinates. The quantization and repetition point removal unit 102 can be used to reduce the number of coordinates through quantization. After quantization, originally different points may be given the same coordinates, and based on this, repetition points may be removed by a de-duplication operation. For example, multiple points with the same quantization position and different attribute information may be merged into one point through attribute transformation. In some implementations of the disclosure, the quantization and repetition point removal unit 102 is an optional unit module. The octree analysis unit 103 can encode position information of quantized points through octree encoding. For example, the point cloud is partitioned in the form of an octree, so that positions of the points may be in a one-to-one correspondence with points of the octree. Positions of occupied nodes in the octree are determined and flags thereof are set to 1, to perform geometry encoding. The first arithmetic encoding unit 105 can perform arithmetic encoding on the position information output from the octree analysis unit 103 through entropy encoding, i.e., the geometry bitstream is generated through arithmetic encoding by using the position information output from the octree analysis unit 103. The geometry bitstream can also be called a geometry code stream.

The attribute encoding can be achieved with the following units: a color transform unit 110, an attribute transfer unit 111, a region adaptive hierarchical transform (RAHT) unit 112, a predicting transform unit 113, and a lifting transform unit 114, a quantization unit 115, and a second arithmetic encoding unit 116.

The color transform unit 110 can be used to transform an RGB color space of the points in the point cloud to YCbCr format or other formats. The attribute transfer unit 111 can be used to transform the attribute information of the points in the point cloud to minimize attribute distortion. For example, the attribute transfer unit 111 may be used to obtain actual values of the attribute information of the points. For example, the attribute information may be color information of the points. After the actual values of the attribute information of the points are obtained through transformation of the attribute transfer unit 111, any prediction unit can be selected to predict the points in the point cloud. The units for predicting the points in the point cloud may include at least one of: the RAHT unit 112, the predicting transform unit 113, and the lifting transform unit 114. In other words, any of the RAHT unit 112, the predicting transform unit 113, and the lifting transform unit 114 can be used to predict attribute information of a point in the point cloud to obtain a predicted value of the attribute information of the point, and further obtain a residual value of the attribute information of the point based on the predicted value of the attribute information of the point. For example, the residual value of the attribute information of the point may be the actual value of the attribute information of the point minus the predicted value of the attribute information of the point.

The predicting transform unit 113 can also be used to generate a level of detail (LOD), to predict attribute information of points in the LOD sequentially, and to calculate prediction residuals, for subsequent quantization encoding. Specifically, for each point in the LOD, three nearest neighboring points are found in the previous LOD, and then the current point is predicted according to reconstructed values of the three neighboring points to obtain a predicted value; based on this, a residual value of the current point can be obtained based on the predicted value of the current point and an actual value of the current point. For example, the residual value can be determined based on the following formula:

$$attrResidualQuant = (attrValue - attrPred)/Qstep;$$

where attrResidualQuant represents the residual value of the current point, attrPred represents the predicted value of the current point, attrValue represents the actual value of the current point, and Qstep represents a quantization step size. Qstep is calculated from the quantization parameter (Qp).

The current point will be used as the nearest neighbor of a subsequent point(s), and the reconstructed value of the current point will be used to predict attribute information of the subsequent point. The reconstructed value of the attribute information of the current point can be obtained through the following formula:

$$reconstructedColor = attrResidualQuant \times Qstep + attrPred;$$

where reconstructedColor denotes the reconstructed value of the current point, attrResidualQuant denotes the residual value of the current point, Qstep denotes the quantization step size, and attrPred denotes the predicted value of the current point. Qstep is calculated from the quantization parameter (Qp).

The generation process of the LOD includes: obtaining Euclidean distances among the points according to the position information of the points in the point cloud, and partitioning the points into different LOD layers according to the Euclidean distances. In one implementation, the Euclidean distances can be sorted and then points corresponding to different ranges of Euclidean distances are partitioned into different LOD layers. For example, a point can be randomly selected and classified into a first LOD layer. Then, Euclidean distances between remaining points and the point are calculated, and points whose Euclidean distances satisfy a first threshold are classified into a second LOD layer. The centroid of the points in the second LOD layer is obtained, Euclidean distances between points other than the first LOD layer and second LOD layer and the centroid is calculated, and points whose Euclidean distances satisfy a second threshold are classified into a third LOD layer. The above is continued until all points are classified into LOD layers. The threshold value of the Euclidean distance can be adjusted, so that the number of points in each LOD layer is increasing. It should be understood that, the LOD layer partition can be achieved in other ways, which is not limited in the disclosure. It should be noted that, the point cloud can be directly partitioned into one or more LOD layers, or the point cloud can be first partitioned into multiple point cloud slices, and each point cloud slice can be partitioned into one or more LOD layers. For example, the point cloud can be partitioned into multiple point cloud slices, and the number of points in each point cloud slice can range from 550,000 to 1.1 million. Each point cloud slice can be viewed as a separate point cloud. Each point cloud slice can be partitioned into multiple LOD layers, where each LOD layer includes multiple points. In one implementation, the LOD layer partition is based on the Euclidean distance among points.

Figure 2:
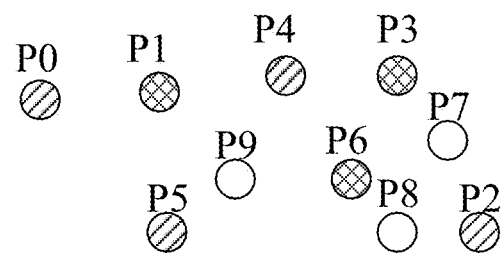
FIG. 2 is a schematic block diagram of a level of detail (LOD) layer provided in implementations of the disclosure.
Figure 2:
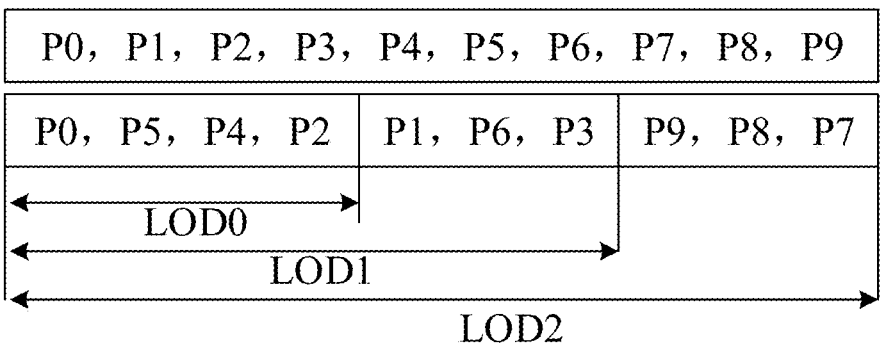

FIG. 2 is a schematic block diagram of an LOD layer provided in implementations of the disclosure.

As illustrated in FIG. 2, assume that the point cloud includes multiple points arranged in an original order, i.e., P0, P1, P2, P3, P4, P5, P6, P7, P8, and P9, and assume that the point cloud can be partitioned into three LOD layers, i.e., LOD0, LOD1, and LOD2, based on Euclidean distances among points. LOD0 may include P0, P5, P4, and P2, LOD2 may include P1, P6, and P3, and LOD3 may include P9, P8, and P7. In this case, LOD0, LOD1, and LOD2 can be used to form an LOD-based order of the point cloud, i.e., P0, P5, P4, P2, P1, P6, P3, P9, P8, and P7. The LOD-based order can be used as an encoding order of the point cloud.

The quantization unit 115 may be used to quantize the residual values of the attribute information of the points. For example, if the quantization unit 115 is connected with the predicting transform unit 113, the quantization unit may be used to quantize a residual value of attribute information of a point output from the predicting transform unit 113. For example, the residual value of the attribute information of the point output from the predicting transform unit 113 is quantized by using the quantization step size, to improve system performance. The second arithmetic encoding unit 116 may perform entropy encoding on the residual value of the attribute information of the point using zero run length coding, to obtain the attribute bitstream. The attribute bitstream may be bitstream information.

It should be understood that, in implementations of the disclosure, the predicted value of the attribute information of the point in the point cloud may also be called the predicted color in the LOD mode. The actual value of the attribute information of the point minus the predicted value of the attribute information of the point is the residual value of the point. The residual value of the attribute information of the point can also be called the residual color in the LOD mode. The predicted value of the attribute information of the point and the residual value of the attribute information of the point are added to obtain the reconstructed value of the attribute information of the point. The reconstructed value of the attribute information of the point can also be called the reconstructed color in the LOD mode.

Figure 3:
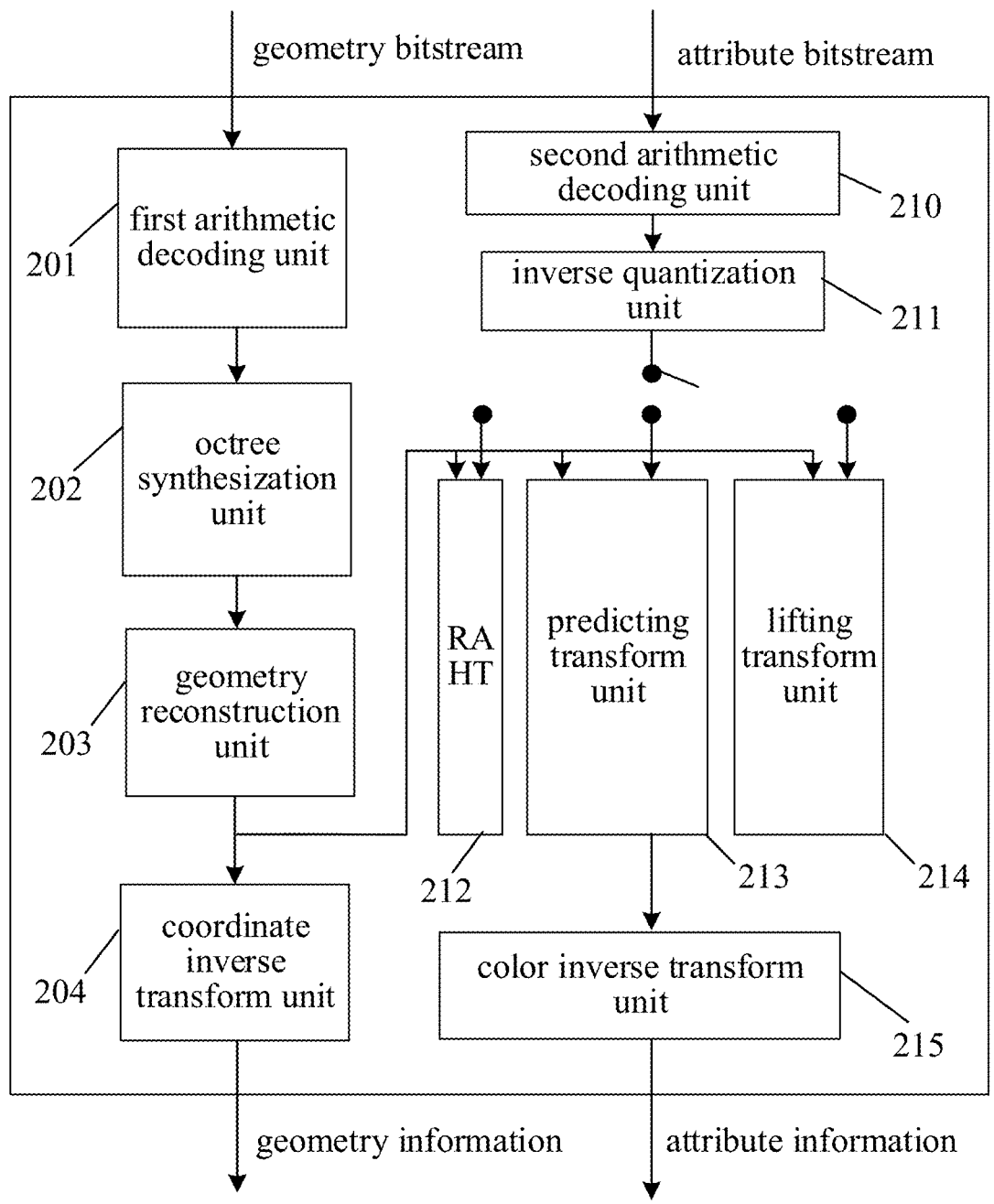
FIG. 3 is a schematic block diagram of a decoding framework provided in implementations of the disclosure.

FIG. 3 is a schematic block diagram of a decoding framework 200 provided in implementations of the disclosure.

As illustrated in FIG. 3, the decoding framework 200 can obtain a bitstream of a point cloud from an encoding device and obtain position information and attribute information of points in the point cloud by parsing the bitstream. The decoding of the point cloud includes position decoding and attribute decoding. In one implementation, the process of position decoding includes: performing arithmetic decoding on the geometry bitstream; performing synthetization after constructing an octree, and reconstructing the position information of the points, to obtain reconstructed information of the position information of the points; and performing coordinate transformation on the reconstructed information of the position information of the points to obtain the position information of the points. The position information of the points may also be referred to as geometry information of the points.

The process of attribute decoding includes: parsing the attribute bitstream to obtain residual values of the attribute information of the points in the point cloud; performing inverse quantization on the residual values of the attribute information of the points, to obtain residual values of the attribute information of the points after inverse quantization; selecting one of the three prediction modes to perform point cloud prediction based on the reconstructed information of the position information of the points obtained during position decoding, to obtain predicted values, and obtaining reconstructed values of the attribute information of the points based on the predicted values and the residual values; and performing color space inverse transformation on the reconstructed values of the attribute information of the points, to obtain the decoded point cloud.

As illustrated in FIG. 3, the position decoding can be achieved with the following units: a first arithmetic decoding unit 201, an octree synthesization unit 202, a geometry reconstruction unit 203, and a coordinate inverse transform unit 204. The attribute decoding can be achieved with the following units: a second arithmetic decoding unit 210, an inverse quantization unit 211, an RAHT unit 212, a predicting transform unit 213, a lifting transform unit 214, and a color inverse transform unit 215.

It should be noted that, decompression is the inverse process of compression, and similarly, functions of various units in the decoding framework 200 can be referred to the functions of corresponding units in the encoding framework 100. For example, in the decoding framework 200, the point cloud can be partitioned into LODs based on Euclidean distances among points in the point cloud, and then attribute information of the points in the LODs is decoded sequentially. For example, the number of zeros (zero_cnt) in the zero run length coding technique is calculated, to decode a residual value based on the number of zeros, and then in the decoding framework 200, inverse quantization may be performed on the decoded residual value, and a reconstructed value of the point is obtained by adding the residual value after inverse quantization and a predicted value of the current point, until all points are decoded. The decoding operation is performed based on the zero run length coding technique. First, the size of the first zero_cnt in the bitstream is obtained, if it is greater than 0, it means that the residual value of the attribute information of this point is 0; if zero_cnt is equal to 0, it means that the residual value of the attribute information of this point is not 0. If the residual value is 0, the residual value is parsed with a first parsing function; if the residual value is not 0, the residual value is parsed with a second parsing function. The current point will be used as the nearest neighbor of a subsequent point(s) in the LOD, and the reconstructed value of the current point will be used to predict attribute information of the subsequent point. Furthermore, regarding inverse transform and inverse quantization (or called scale/scaling), for the orthogonal transform, if one matrix is used for the transform, another matrix is used for the inverse transform. For the decoding method, the matrix used in the decoder can be called the "transform" matrix.

Implementations of the disclosure provide a point cloud decoding method, a point cloud encoding method, a decoder, and an encoder, to improve a reconstruction accuracy in the process of point cloud decoding, and further improve decoding effect.

Figure 4:
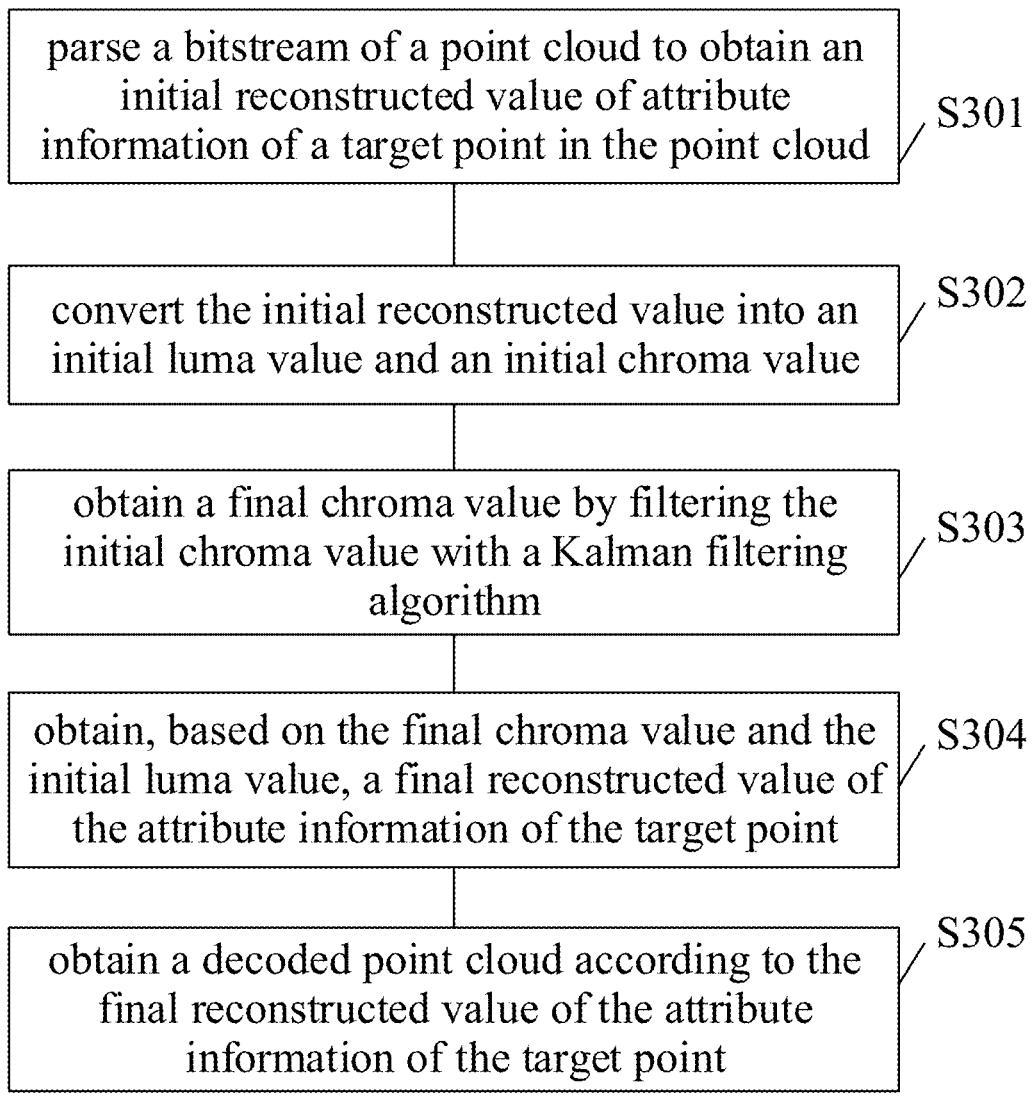
FIG. 4 is a schematic flow chart of a point cloud decoding method provided in implementations of the disclosure.

FIG. 4 illustrates a schematic flow chart of a point cloud decoding method 300 according to implementations of the disclosure. The point cloud decoding method 300 may be executed by a decoding end, for example, the decoding framework 200 illustrated in FIG. 3, i.e., the point cloud decoder TMC13. For the sake of illustration, technical solutions of the disclosure are described below with the decoder as the execution entity.

As illustrated in FIG. 4, the decoding method 300 may include the following.

At S301, a bitstream of a point cloud is parsed to obtain an initial reconstructed value of attribute information of a target point in the point cloud.

At S302, the initial reconstructed value is converted into an initial luma value and an initial chroma value.

At S303, a final chroma value is obtained by filtering the initial chroma value with a Kalman filtering algorithm.

At S304, a final reconstructed value of the attribute information of the target point is obtained based on the final chroma value and the initial luma value.

At S305, a decoded point cloud is obtained according to the final reconstructed value of the attribute information of the target point.

Specifically, the initial reconstructed value can be a value in RGB format, for example, the initial reconstructed value F can be obtained by mixing different components R, G, and B, i.e., F=r[R]+g[G]+b[B], where r, g, and b are coefficients of mixing of three primary colors, respectively. When the three primary color components are all 0 (the weakest), the mixed color is black; and when the three primary color components are all k (the strongest), the mixed color is white. Various colors between black and white can be obtained through mixing by adjusting the values of r, g, and b. RGB can be converted to luma value (i.e., luma signal Y) and chroma values (i.e., chroma signal Cr and chroma signal Cb) through color space conversion. The color including the chroma values and the luma value is the so-called YCbCr color space. In implementations of the disclosure, Kalman filtering is performed on the converted initial chroma value, to enhance the decoding effect.

In the solutions provided in the disclosure, the initial reconstructed value is converted into the initial luma value and the initial chroma value, and only the initial chroma value is filtered with the Kalman filtering algorithm. As such, the reconstruction accuracy of the attribute information of the target point can be improved, and the quality of the reconstruction process of the points can be enhanced, and accordingly, the decoding effect of the point cloud coding can be improved. Furthermore, since the Kalman filtering algorithm is more suitable for processing steady signals, and the luma values of the point cloud have large fluctuation, filtering only the initial chroma value with the Kalman filtering algorithm can improve the filtering effect and further improve the decoding effect of the point cloud coding.

Based on the technical solutions provided in the disclosure, tests are conducted on the G-PCC reference software TMC13 V11.0, and some test sequences required by the MPEG are tested under the CTC CY test condition. The test results are illustrated in Table 1 below, and the performance improvement effect is explained below in conjunction with Table 1.

TABLE 1

| Test Sequence | Luma | Chroma (blue chroma) | Chroma (red chroma) |
|---|---|---|---|
| Class A point cloud sequence | −0.8% | −5.7% | −7.4% |
| Class B point cloud sequence | −0.3% | −3.6% | −4.2% |
| Average of class A and class B point cloud sequences | −0.5% | −4.6% | −5.7% |

As illustrated in Table 1, the solutions of implementations of the disclosure are used, "-" represents the decrease of Bjøntegaard delta bit rate (BD-bit rate, BD-BR, or BDBR), the BDBR represents the bit rate difference under the same peak signal to noise ratio (PSNR), and the smaller BDBR indicates the better performance of the encoding algorithm. As illustrated in Table 1, class A point cloud sequence represents a point cloud in which points include color information and other attribute information, and class B point cloud sequence represents a point cloud in which points include only color information. According to the average BDBR of class A and class B point cloud sequences, it is objectively and truly reflected that the performance of the encoding algorithm can be improved by introducing the quantization weight.

It should be noted that, in general, a decrease in bit rate and an increase in PSNR can indicate a better performance of the new method. However, a case can occur where the bit rate is reduced relative to the original method, but the PSNR, i.e., the quality of the video, is reduced, in which case the performance of the encoding algorithm can be measured using the BDBR. In video processing, other parameters can be used to measure the performance of the encoding algorithm, to characterize the change in bit rate and PSNR of the video obtained using the new method relative to the video obtained using the original method, which is not specifically limited in implementations of the disclosure. For example, Bjøntegaard delta peak signal-to-noise rate (BD-PSNR or BDPSNR) may also be used to measure the performance of the encoding algorithm, where the BDPSNR represents the difference in PSNR at the same bit rate, and a larger BDPSNR indicates better performance of the encoding algorithm.

It should be noted that, the Kalman filtering process in implementations of the disclosure can be combined to the post-processing process of the decoder or to the filtering process in the loop, which is not specifically limited in implementations of the disclosure. In addition, the point cloud involved in the disclosure can be a complete point cloud or a point cloud slice formed by partitioning the complete point cloud.

Figure 5:
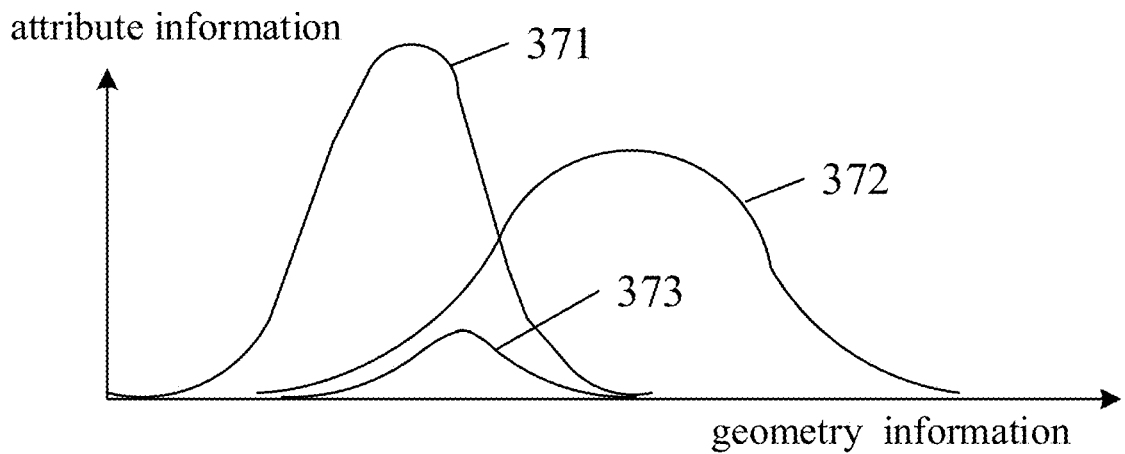
FIG. 5 is a schematic diagram of a principle of Kalman filtering provided in implementations of the disclosure.

FIG. 5 is a schematic diagram of a principle of Kalman filtering provided in implementations of the disclosure.

As illustrated in FIG. 5, the initial chroma value of the attribute information of the target point may be represented by curve 371, the final chroma value of the attribute information of the target point may be represented by curve 372, and a measurement value of the attribute information of the target point may be represented by curve 373. In other words, the measurement value of the attribute information of the target point may be used to filter the initial chroma value of the attribute information of the target point to obtain the final chroma value of the attribute information of the target point. The initial chroma value may also be called a priori estimate, and the final chroma value may also be called an optimal estimate or a posteriori estimate. For example, the Kalman filtering on the target point in the point cloud can include a prediction process and a correction process. Assume that the target point is a k-th point in the point cloud; in the prediction process, the state of the k-th point can be estimated according to an initial chroma value of a (k−1)-th point, to obtain the measurement value of the k-th point; in the correction process, the measurement value of the k-th point is used to correct the initial chroma value of the k-th point, to obtain the final chroma value of the k-th point.

In some implementations of the disclosure, S303 may include the following. The final chroma value is obtained by using chroma values of reconstructed values of attribute information of one or more points preceding the target point as a measurement value and filtering the initial chroma value with the Kalman filtering algorithm.

For example, the reconstructed values of the attribute information of the one or more points preceding the target point may be the reconstructed value of the attribute information of one point preceding the target point. For another example, the reconstructed values of the attribute information of the one or more points preceding the target point may be the average, maximum, or minimum value of the reconstructed values of the attribute information of the multiple points preceding the target point. For example, chroma values of initial reconstructed values of the attribute information of the one or more points preceding the target point are used as the measurement value, and the initial chroma value is filtered with the Kalman filtering algorithm, to obtain the final chroma value. For example, chroma values of final reconstructed values of the attribute information of the one or more points preceding the target point are used as the measurement value, and the initial chroma value is filtered with the Kalman filtering algorithm, to obtain the final chroma value. Optionally, the one or more points preceding the target point are one or more points which precede the target point in a decoding order. Apparently, the one or more points preceding the target point may also be one or more points determined in other order. It is to be noted that, the one or more points preceding the target point may be understood as one or more points preceding the target point in the LOD layer in which the target point is located or may be understood as one or more points before the target point in the encoding order.

In short, the decoder will use the chroma values of the reconstructed values as the measurement value and filter the initial chroma value with the Kalman filtering algorithm, to obtain the final chroma value.

As an example, S303 may include the following. An average reconstructed value of the reconstructed values of the attribute information of the one or more points preceding the target point is calculated. The average reconstructed value is converted into an average luma value and an average chroma value. The final chroma value is obtained by using the average chroma value as the measurement value and filtering the initial chroma value with the Kalman filtering algorithm.

Apparently, as mentioned above, using the average chroma value as the measurement is merely an example provided in the disclosure, which should not be construed as a limitation to the disclosure.

In some implementations of the disclosure, a residual value of the attribute information of the target point is obtained by performing inverse quantization based on a target quantization step size among multiple quantization step sizes, and S302 may include the following. The initial reconstructed value is converted into the initial luma value and the initial chroma value, when the target quantization step size is greater than or equal to a threshold N, where N is a non-negative integer. Optionally, the multiple quantization step sizes are sorted in an ascending order, where N is a value of an n-th quantization step size in the multiple quantization step sizes, and n is a positive integer.

In other words, when inverse quantization is performed based on a larger quantization step size, the initial reconstructed value is converted into the initial luma value and the initial chroma value.

Assume that there are five quantization step sizes, which correspond to five bit rates. Assume that for only the larger last three quantization step sizes (i.e., the target quantization step sizes), the Kalman filtering is performed, and for the first two quantization step sizes, no processing is performed. The larger the quantization step size, the larger the error between the reconstructed value of the attribute information of the point and the actual value of the attribute information of the point, and the worse the quality of the reconstructed value of the attribute information of the point. Based on this, even if the Kalman filtering is performed for the first two quantization step sizes, since the errors of the reconstructed values of the attribute information of the points are very small, the filtering effect will be not good. If the Kalman filtering is performed for only the larger last three quantization step sizes, the filtering effect of the reconstructed values of the attribute information of the points are better, which can simplify the filtering process and ensure the decoding effect.

In some implementations of the disclosure, S302 may include the following. The initial reconstructed value is converted into the initial luma value and the initial chroma value with a color space conversion function, where the initial luma value and the initial chroma value are in a color space supported by a display screen. Optionally, the color space conversion function may be transformGbrToYCbCrBt709. Optionally, the color space may also be called the color gamut space.

Apparently, the disclosure aims to protect using the color space conversion function to convert the initial reconstructed values into the color space or gamut space supported by the display screen, and the specific conversion function is not limited in implementations of the disclosure. For example, different conversion functions can be used according to the properties of the display screen, or even different conversion functions can be used based on the color space or gamut space involved in different coding standards.

In some implementations of the disclosure, S301 may include the following. When the number of points in one LOD layer of the point cloud is less than a threshold M, for each point in the LOD layer, an initial reconstructed value of attribute information of the point is obtained based on a residual value of the attribute information of the point and a predicted value of the attribute information of the point in lossless encoding (in other words, the residual value of the attribute information of the point is subject to lossless encoding). When the number of points in one LOD layer of the point cloud is greater than or equal to the threshold M, for an (m*M)-th point in the LOD layer, an initial reconstructed value of attribute information of the point is obtained based on a residual value of the attribute information of the point and a predicted value of the attribute information of the point in lossless encoding, where M is a positive integer greater than 1 and m is a positive integer greater than 0.

For points in the LOD layer arranged at the front in the encoding order, due to larger Euclidean distances, the quantization process may introduce large quantization error. Residual values of attribute information of some points are not quantized, which means that reconstructed values of the attribute information of some points are actual values, thereby improving the accuracy of reconstructed values of attribute information of all points in the point cloud. As the accuracy of the reconstructed values improves, the updating and iteration process of the Kalman filtering can be more accurate, thereby further improving the decoding effect. The decoder does not perform inverse quantization on points at the same position, to obtain the reconstruction values with correct and better quality.

Optionally, the method 300 may further include the following. The bitstream is parsed to obtain the number of points in the bitstream of which residual values of attribute information do not require inverse quantization.

In some implementations of the disclosure, S301 may include the following. When the number of points in one LOD layer of the point cloud is less than a threshold T, for each point in the LOD layer, a final reconstructed value of attribute information of the point is replaced with an actual value of the attribute information of the point. When the number of points in one LOD layer of the point cloud is greater than or equal to the threshold T, for a (t*T)-th point in the LOD layer, a final reconstructed value of attribute information of the point is replaced with an actual value of the attribute information of the point, where T is a positive integer greater than 1 and t is a positive integer greater than 0.

For points in the LOD layer arranged at the front in the encoding order, due to larger Euclidean distances, the quantization process may introduce large quantization error. Final reconstructed values of some points are replaced with actual values, thereby improving the accuracy of reconstructed values of attribute information of all points in the point cloud. As the accuracy of the reconstructed values improves, the updating and iteration process of the Kalman filtering can be more accurate, thereby further improving the decoding effect. The decoder adopts actual values for points at the same position, to obtain the reconstruction values with correct and better quality.

Optionally, the method 300 may further include the following. The bitstream is parsed to obtain the number of points in the bitstream of which final reconstructed values of attribute information are actual values and obtain the actual values of the attribute information of the points.

In some implementations of the disclosure, the method 300 may further include the following. The point cloud is partitioned into one or more LOD layers, where each LOD layer includes one or more points.

In some implementations of the disclosure, S301 may include the following. The bitstream is parsed to obtain reconstruction information of position information of the target point. A predicted value of the attribute information of the target point is obtained according to the reconstruction information of the position information of the target point. The bitstream is parsed to obtain a residual value of the attribute information of the target point. The initial reconstructed value of the attribute information of the target point is obtained according to the predicted value of the attribute information of the target point and the residual value of the attribute information of the target point.

Figure 6:
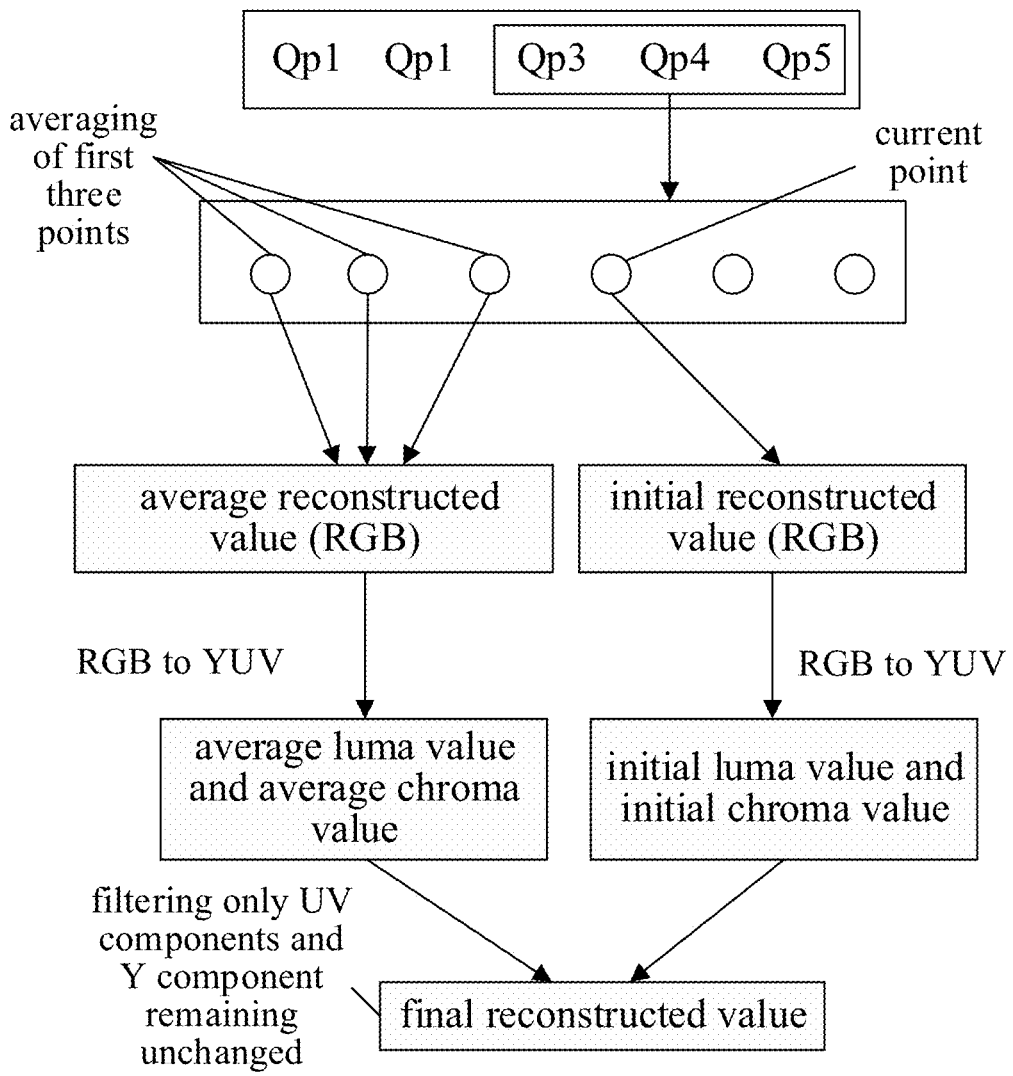
FIG. 6 is another schematic flow chart of a point cloud decoding method provided in implementations of the disclosure.

FIG. 6 is another schematic diagram of a decoding method provided in implementations of the disclosure.

As illustrated in FIG. 6, assume that there are five quantization step sizes (i.e., Qp1, Qp2, Qp3, Qp4, and Qp5), which correspond to five bit rates. Assume that the last three quantization step sizes (i.e., Qp3, Qp4, and Qp5) are greater than or equal to the threshold N, i.e., the Kalman filtering is performed for only the larger last three quantization step sizes (i.e., Qp3, Qp4, and Qp5), and no processing is performed for the first two quantization step sizes. Based on this, the Kalman filtering operation can be performed on the reconstructed value of each point sequentially according to the generation order of LOD.

Specifically, the decoder traverses the point cloud to obtain an initial reconstructed value of the attribute information of the current point in the point cloud, which is an RGB value, and the decoder calculates an average reconstructed value of reconstructed values of attribute information of three points preceding the current point. Then, the decoder may use the function transformGbrToYCbCrBt709 to convert the initial reconstructed value of the current point and the average reconstructed value of the reconstructed values of the three points from the RGB domain to the YUV domain, i.e., the decoder obtains an average chroma value and an average luma value of the average reconstructed value, and an initial chroma value and an initial luma value of the current point. Thereafter, the decoder performs Kalman filtering by using the obtained average chroma value as the measurement value and the initial chroma value as the predicted value, to obtain the final chroma value of the current point. Then, the final reconstructed value is obtained based on the final chroma value and the initial luma value of the current point. In other words, the UV components of the YUV components are used as the input parameter required for the Kalman filtering, i.e., the measurement value, and the UV components of the YUV components of the current point are used as the other input parameter for the Kalman filtering, i.e., the predicted value. After the Kalman filtering is completed, the final reconstructed value after filtering will overwrite the initial reconstructed value of the current point.

In the implementation, when the larger quantization step size is selected, the Kalman filtering is performed on only the initial chroma value, which avoids the quality loss of the initial luma value, improving the filtering performance.

Figure 7:
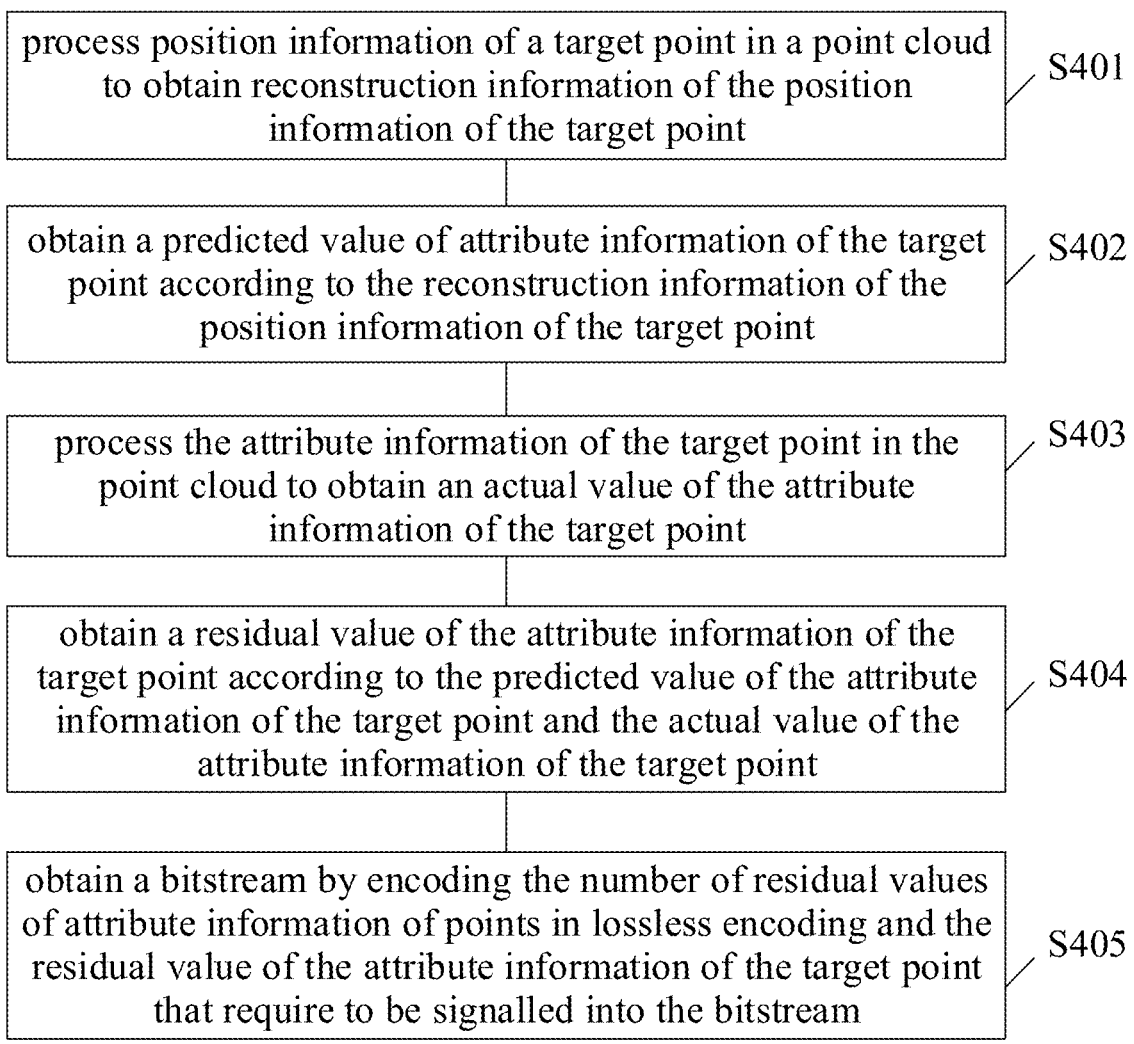
FIG. 7 is a schematic flow chart of a point cloud encoding method provided in implementations of the disclosure.

FIG. 7 is a schematic flow chart of a point cloud encoding method 400 provided in implementations of the disclosure. The method 400 may be performed by an encoding end, for example, the encoding framework 100 illustrated in FIG. 1 or encoder.

As illustrated in FIG. 7, the method 400 may include the following.

S401, position information of a target point in a point cloud is processed to obtain reconstruction information of the position information of the target point.

S402, a predicted value of attribute information of the target point is obtained according to the reconstruction information of the position information of the target point.

S403, the attribute information of the target point in the point cloud is processed to obtain an actual value of the attribute information of the target point.

S404, a residual value of the attribute information of the target point is obtained according to the predicted value of the attribute information of the target point and the actual value of the attribute information of the target point.

S405, a bitstream is obtained by encoding the number of residual values of attribute information of points in lossless encoding and the residual value of the attribute information of the target point that require to be signalled into the bitstream.

In some implementations of the disclosure, S405 may include the following. When the number of points in one LOD layer of the point cloud is less than a threshold M, for each point in the LOD layer, the bitstream is obtained by encoding a residual value of attribute information of a point not subject to inverse quantization. When the number of points in one LOD layer of the point cloud is greater than or equal to the threshold M, for an (m*M)-th point in the LOD layer, the bitstream is obtained by encoding a residual value of attribute information of a point not subject to inverse quantization, where M is a positive integer greater than 1 and m is a positive integer greater than 0.

Specifically, the encoder processes the position information of the target point in the point cloud to obtain the reconstruction information of the position information of the target point; the encoder obtains the predicted value of the attribute information of the target point according to the reconstruction information of the position information of the target point; the encoder processes the attribute information of the target point in the point cloud to obtain the actual value of the attribute information of the target point; the encoder obtains the residual value of the attribute information of the target point according to the predicted value of the attribute information of the target point and the actual value of the attribute information of the target point; and the encoder obtains the bitstream by encoding the residual value of the attribute information of the target point. Optionally, the encoder can encode the number of points of which residual values of attribute information do not require quantization. For example, when the number of points in one LOD layer of the point cloud is less than the threshold M, for each point in the LOD layer, the encoder obtains the bitstream by encoding a residual value of attribute information of a point not subject to inverse quantization; when the number of points in one LOD layer of the point cloud is greater than or equal to the threshold M, for an (m*M)-th point in the LOD layer, the encoder obtains the bitstream by encoding a residual value of attribute information of a point not subject to inverse quantization, where M is a positive integer greater than 1 and m is a positive integer greater than 0.

In some implementations of the disclosure, the method 400 may further include the following. The point cloud is partitioned into one or more LOD layers, where each LOD layer includes one or more points.

The preferred implementations of the disclosure are described in detail above in conjunction with the accompanying drawings. However, the disclosure is not limited to the specific details in the above implementations. Within the technical conception of the disclosure, various simple variants of technical solutions of the disclosure can be made, and these simple variants all fall within the protection scope of the disclosure. For example, each specific technical feature described in the above implementations can be combined in any suitable way without contradiction, and to avoid unnecessary repetition, the various possible combinations are not described separately in the disclosure. For example, various implementations of the disclosure can also be combined in any way, and as long as they do not contradict the idea of the disclosure, they should also be considered as disclosed in the disclosure. It should also be understood that in the various method implementations of the disclosure, the numbering of each process mentioned above does not imply the order of execution, and the order of execution of each process shall be determined by its function and inherent logic, which shall not constitute any limitation to the implementation process of the implementations of the disclosure.

The encoder or decoder for the point cloud provided in implementations of the disclosure will be described below in conjunction with the accompanying drawings.

Figure 8:
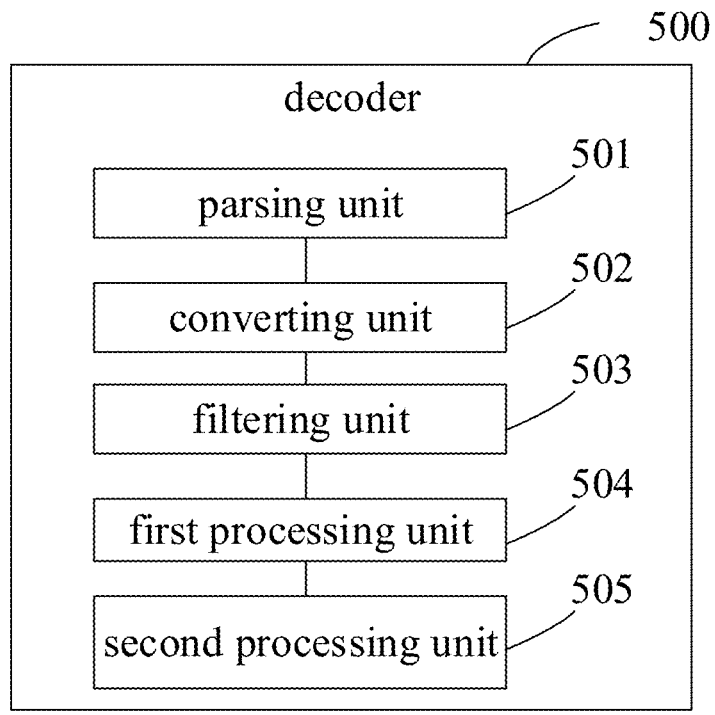
FIG. 8 is a schematic block diagram of a decoder provided in implementations of the disclosure.

FIG. 8 is a schematic block diagram of a decoder 500 for a point cloud provided in implementations of the disclosure.

As illustrated in FIG. 8, the decoder 500 may include a parsing unit 501, a converting unit 502, a filtering unit 503, a first processing unit 504, and a second processing unit 505. The parsing unit 501 is configured to parse a bitstream of a point cloud to obtain an initial reconstructed value of attribute information of a target point in the point cloud. The converting unit 502 is configured to convert the initial reconstructed value into an initial luma value and an initial chroma value. The filtering unit 503 is configured to obtain a final chroma value by filtering the initial chroma value with a Kalman filtering algorithm. The first processing unit 504 is configured to obtain, based on the final chroma value and the initial luma value, a final reconstructed value of the attribute information of the target point. The second processing unit 505 is configured to obtain a decoded point cloud according to the final reconstructed value of the attribute information of the target point.

In some implementations of the disclosure, the filtering unit 503 is configured to: calculate an average reconstructed value of the reconstructed values of the attribute information of the one or more points preceding the target point, convert the average reconstructed value into an average luma value and an average chroma value, and obtain the final chroma value by using the average chroma value as the measurement value and filter the initial chroma value with the Kalman filtering algorithm.

In some implementations of the disclosure, the one or more points preceding the target point are one or more points which precede the target point in a decoding order.

In some implementations of the disclosure, a residual value of the attribute information of the target point is obtained by performing inverse quantization based on a target quantization step size among multiple quantization step sizes, and the converting unit 502 is configured to: convert the initial reconstructed value into the initial luma value and the initial chroma value, when the target quantization step size is greater than or equal to a threshold N, where N is a non-negative integer.

In some implementations of the disclosure, the multiple quantization step sizes are sorted in an ascending order, where N is a value of an n-th quantization step size in the multiple quantization step sizes, and n is a positive integer.

In some implementations of the disclosure, the converting unit 502 is configured to: convert the initial reconstructed value into the initial luma value and the initial chroma value with a color space conversion function, where the initial luma value and the initial chroma value are in a color space supported by a display screen.

In some implementations of the disclosure, the parsing unit 501 is configured to: when the number of points in one LOD layer of the point cloud is less than a threshold M, for each point in the LOD layer, obtain an initial reconstructed value of attribute information of the point based on a residual value of the attribute information of the point and a predicted value of the attribute information of the point in lossless encoding; or when the number of points in one LOD layer of the point cloud is greater than or equal to the threshold M, for an (m*M)-th point in the LOD layer, obtain an initial reconstructed value of attribute information of the point based on a residual value of the attribute information of the point and a predicted value of the attribute information of the point in lossless encoding, where M is a positive integer greater than 1 and m is a positive integer greater than 0.

In some implementations of the disclosure, the parsing unit 501 is further configured to: parse the bitstream to obtain the number of points in the bitstream of which residual values of attribute information do not require inverse quantization.

In some implementations of the disclosure, the parsing unit 501 is configured to: when the number of points in one LOD layer of the point cloud is less than a threshold T, for each point in the LOD layer, replace a final reconstructed value of attribute information of the point with an actual value of the attribute information of the point; or when the number of points in one LOD layer of the point cloud is greater than or equal to the threshold T, for a (t*T)-th point in the LOD layer, replace a final reconstructed value of attribute information of the point with an actual value of the attribute information of the point, where T is a positive integer greater than 1 and t is a positive integer greater than 0.

In some implementations of the disclosure, the parsing unit 501 is further configured to: parse the bitstream to obtain the number of points in the bitstream of which final reconstructed values of attribute information are actual values and obtain the actual values of the attribute information of the points.

In some implementations of the disclosure, the parsing unit 501 is further configured to: partition the point cloud into one or more LOD layers, where each LOD layer includes one or more points.

In some implementations of the disclosure, the parsing unit 501 is configured to: parse the bitstream to obtain reconstruction information of position information of the target point; obtain a predicted value of the attribute information of the target point according to the reconstruction information of the position information of the target point; parse the bitstream to obtain a residual value of the attribute information of the target point; and obtain the initial reconstructed value of the attribute information of the target point according to the predicted value of the attribute information of the target point and the residual value of the attribute information of the target point.

Figure 9:
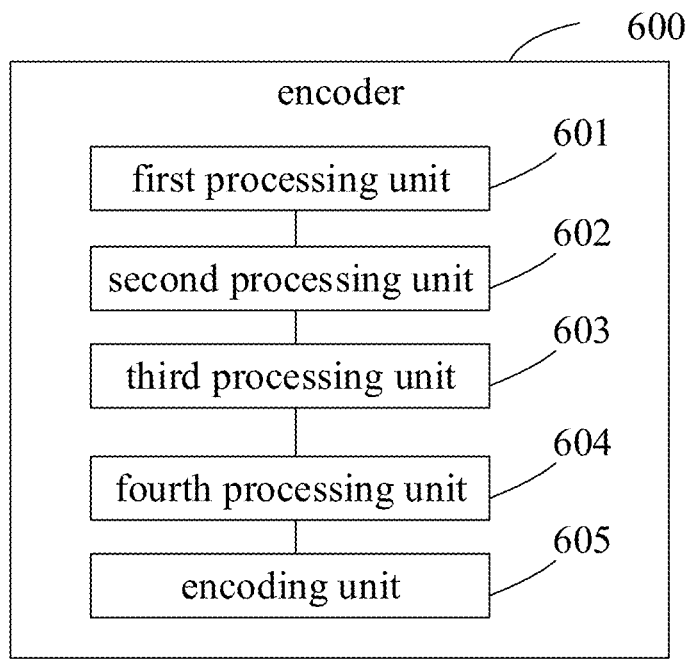
FIG. 9 is a schematic block diagram of an encoder provided in implementations of the disclosure.

FIG. 9 is a schematic block diagram of an encoder 600 for the point cloud provided in implementations of the disclosure.

As illustrated in FIG. 9, the encoder 600 includes a first processing unit 601, a second processing unit 602, a third processing unit 603, a fourth processing unit 604, and an encoding unit 605. The first processing unit 601 is configured to process position information of a target point in a point cloud to obtain reconstruction information of the position information of the target point. The second processing unit 602 is configured to obtain a predicted value of attribute information of the target point according to the reconstruction information of the position information of the target point. The third processing unit 603 is configured to process the attribute information of the target point in the point cloud to obtain an actual value of the attribute information of the target point. The fourth processing unit 604 is configured to obtain a residual value of the attribute information of the target point according to the predicted value of the attribute information of the target point and the actual value of the attribute information of the target point. The encoding unit 605 is configured to obtain a bitstream by encoding the number of residual values of attribute information of points in lossless encoding and the residual value of the attribute information of the target point that require to be signalled into the bitstream.

In some implementations of the disclosure, the encoding unit 605 is configured to: when the number of points in one LOD layer of the point cloud is less than a threshold M, for each point in the LOD layer, obtain the bitstream by encoding a residual value of attribute information of a point not subject to inverse quantization; or when the number of points in one LOD layer of the point cloud is greater than or equal to the threshold M, for an (m*M)-th point in the LOD layer, obtain the bitstream by encoding a residual value of attribute information of a point not subject to inverse quantization, where M is a positive integer greater than 1 and m is a positive integer greater than 0.

In some implementations of the disclosure, the first processing unit 601 is configured to partition the point cloud into one or more LOD layers, where each LOD layer includes one or more points.

It is to be understood that the apparatus implementations and the method implementations may correspond to each other, and for similar descriptions, reference may be made to the method implementations. To avoid repetition, details are not described herein again. Specifically, the decoder 500 may correspond to the corresponding subject for performing the method 300 in the implementations of the disclosure, and each unit in the decoder 500 is for implementing the correspond process in the method 300 respectively. Similarly, the encoder 600 may correspond to the corresponding entity for performing the method 400 in the implementations of the disclosure, and each unit in the encoder 600 is for implementing the corresponding process in the method 400. For brevity, details are not described herein again.

It is further to be understood that units of the encoder and the decoder involved in the implementations of the disclosure may be separately or wholly combined into one or several other units, or one (or more) of the units herein may further be partitioned into multiple units of smaller functions. In this way, same operations can be implemented, and implementation of the technical effects of the implementations of the disclosure is not affected. In other words, the foregoing units are partitioned based on logical functions. In an actual implementation, a function of one unit may also be implemented by multiple units, or functions of multiple units are implemented by one unit. In other implementations of the disclosure, the encoder and the decoder may also include other units. During actual implementation, the functions may also be cooperatively implemented by other units and may be cooperatively implemented by multiple units.

According to another implementation of the disclosure, computer programs (including program codes) that can perform the operations involved in the corresponding method may be run on a general computing device such as a general computer, which includes processing elements and storage elements such as a central processing unit (CPU), a random access memory (RAM), and a read-only memory (ROM), to construct the encoder and the decoder involved in the implementations of the disclosure and implement the encoding method and the decoding method provided in the implementations of the disclosure. The computer programs may be recorded in, for example, a computer-readable storage medium, and may be loaded into any electronic device having a processing capability through the computer-readable storage medium, and run in the electronic device, to implement the corresponding method in the implementations of the disclosure. In other words, the units mentioned above may be implemented in the form of hardware, may be implemented by instructions in the form of software, or may be implemented in the form of a combination of software and hardware. Specifically, the operations of the method implementations in the implementations of the disclosure may be completed by a hardware integrated logical circuit in a processor, and/or by using instructions in a form of software. The operations of the methods disclosed with reference to the implementations of the disclosure may be directly performed and completed by using a hardware decoding processor, or may be performed and completed by using a combination of hardware and software in the decoding processor. Optionally, the software may be located in a mature storage medium in the field, such as a random access memory, a flash memory, a read-only memory, a programmable read-only memory, an electrically-erasable programmable memory, or a register. The storage medium is located in the memory. The processor reads information in the memory and completes the operations of the foregoing method implementations in combination with hardware thereof.

Figure 10:
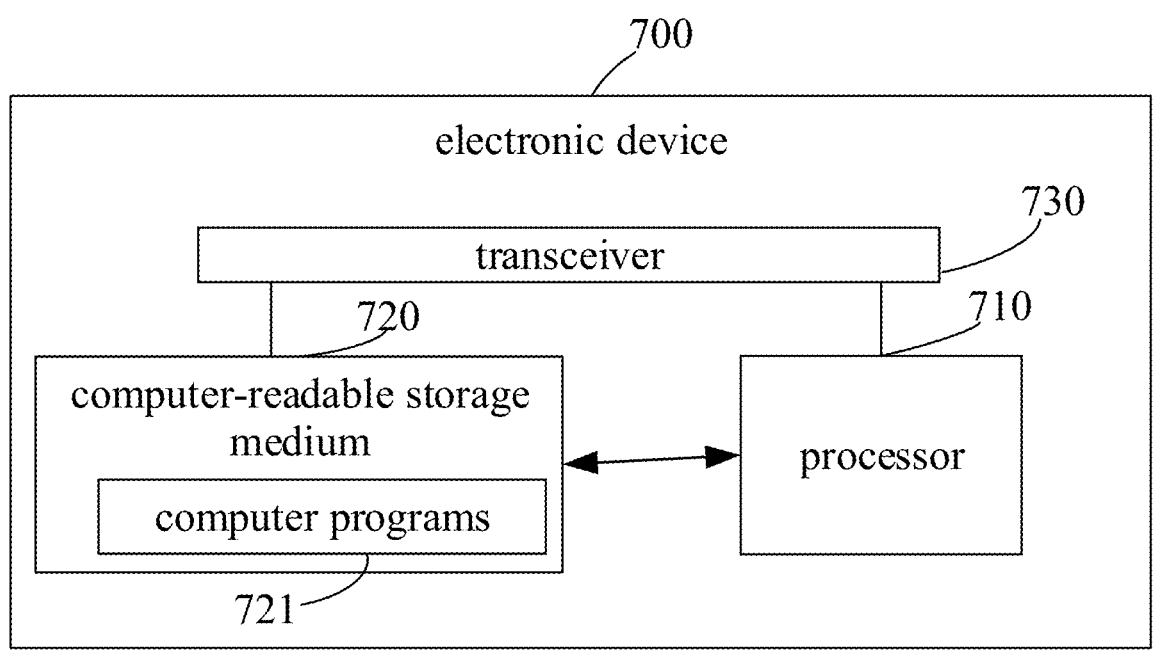
FIG. 10 is a schematic block diagram of an electronic device provided in implementations of the disclosure.

FIG. 10 is a schematic structural diagram of an electronic device 700 provided in implementations of the disclosure.

As illustrated in FIG. 10, the electronic device 700 at least includes a processor 710 and a computer-readable storage medium 720. The processor 710 and the computer-readable storage medium 720 may be connected to each other through a bus or in another manner. The computer-readable storage medium 720 is configured to store computer programs 721 and the computer programs 721 include computer instructions, and the processor 710 is configured to execute the computer instructions stored in the computer-readable storage medium 720. The processor 710 is the computing core and control core of the electronic device 700. The processor 710 is suitable for implementing one or more computer instructions, and are suitable for loading and executing the one or more compute instructions to implement a corresponding method procedure or a corresponding function.

As an example, the processor 710 may also be called a CPU. The processor 710 include but are not limited to: a general processor, a digital signal processor (DSP), an application-specific integrated circuit (ASIC), a field programmable gate array (FPGA), or another programmable logic device, a discrete gate, a transistor logic device, or a discrete hardware component.

As an example, the computer-readable storage medium 720 may be a high-speed RAM memory, or may be a non-volatile memory, such as at least one magnetic disk memory. In some implementations, the computer-readable storage medium 720 may be at least one computer-readable storage medium far away from the processor 710. Specifically, the computer-readable storage medium 720 includes, but is not limited to, a volatile memory and/or a non-volatile memory. The non-volatile memory may be an ROM, a programmable read-only memory (PROM), an erasable programmable read-only memory (EPROM), an electrically erasable programmable read-only memory (EEPROM) or a flash memory. The volatile memory may be an RAM, used as an external cache. Through exemplary but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct Rambus dynamic random access memory (direct Rambus RAM, DR RAM).

The electronic device 700 may also include a transceiver 730. The transceiver 730 may be connected with the processor 710 and/or the computer-readable storage medium 720.

The processor 710 may be configured to control the transceiver 730 to communicate with other devices, specifically, to send information or data to other devices or to receive information or data from other devices. The transceiver 730 may include a transmitter and a receiver. The transceiver 730 may further include an antenna, and the number of antennas may be one or more.

In an implementation, the electronic device 700 may be the decoding framework 200 illustrated in FIG. 3 or the decoder 500 illustrated in FIG. 8. The computer-readable storage medium 720 stores a first computer instruction. The first computer instruction stored in the computer-readable storage medium 720 is loaded and executed by the processor 710, to implement corresponding steps in the method implementations illustrated in FIG. 4. In an implementation process, the first computer instruction in the computer-readable storage medium 720 is loaded and executed by the processor 710 to perform corresponding steps. To avoid repetition, details are not described herein again.

In an implementation, the electronic device 700 may be the encoding framework 100 illustrated in FIG. 1 or the encoder 600 illustrated in FIG. 9. The computer-readable storage medium 720 stores a second computer instruction. The second computer instruction stored in the computer-readable storage medium 720 is loaded and executed by the processor 710, to implement corresponding steps in the method implementations illustrated in FIG. 7. In an implementation process, the second computer instruction in the computer-readable storage medium 720 is loaded and executed by the processor 710 to perform corresponding steps. To avoid repetition, details are not described herein again.

According to another aspect of the disclosure, implementations of the disclosure further provide a computer-readable storage medium (e.g., memory). The computer-readable storage medium is a memory device in the electronic device 700, and is configured to store programs and data. For example, the computer-readable storage medium is the computer-readable storage medium 720. It may be understood that the computer-readable storage medium 720 herein may include an internal storage medium in the electronic device 700, and may also include an extended storage medium supported by the electronic device 700. The computer-readable storage medium provides a storage space, and the storage space stores an operating system of the electronic device 700. In addition, the storage space further stores one or more computer instructions suitable for being loaded and executed by the processor 710, and the one or more computer instructions may be the one or more computer programs 721 (including program codes).

According to another aspect of the disclosure, a computer program product or a computer program is provided. The computer program product or the computer program includes computer instructions, and the computer instructions are stored in a computer-readable storage medium. For example, the computer instructions are the computer programs 721. In this case, the electronic device 700 may be a computer, the processor 710 reads the computer instructions from the computer-readable storage medium 720, and executes the computer instructions, to cause the computer to perform the encoding method or decoding method provided in the various implementations.

In other words, when software is used to implement the implementations, the implementations may be implemented completely or partially in a form of a computer program product. The computer program product includes one or more computer instructions. When the compute instructions are loaded and executed on the computer, the procedure of the implementations of the disclosure is completely or partially run or functions of the implementations of the disclosure are completely or partially implemented. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber or a digital subscriber line (DSL)) or wireless (for example, infrared, wireless or microwave) manner.

A person of ordinary skill in the art may be aware that, the units and process steps of the examples described with reference to the implementations disclosed in the disclosure can be implemented in electronic hardware, or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of the disclosure.

Finally, the contents are merely implementations of the disclosure, but are not intended to limit the protection scope of the disclosure. Any variation or substitution readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A point cloud decoding method, performed by a decoder and comprising:
    parsing a bitstream of a point cloud to obtain an initial reconstructed value of attribute information of a target point in the point cloud;
    converting the initial reconstructed value into an initial luma value and an initial chroma value;
    obtaining a final chroma value by filtering the initial chroma value with a Kalman filtering algorithm;
    obtaining, based on the final chroma value and the initial luma value, a final reconstructed value of the attribute information of the target point; and
    obtaining a decoded point cloud according to the final reconstructed value of the attribute information of the target point;
    wherein obtaining the final chroma value by filtering the initial chroma value with the Kalman filtering algorithm comprises:
    obtaining the final chroma value by using chroma values of reconstructed values of attribute information of one or more points preceding the target point as a measurement value and filtering the initial chroma value with the Kalman filtering algorithm; and
    wherein obtaining the final chroma value by using the chroma values of the reconstructed values of the attribute information of the one or more points preceding the target point as the measurement value and filtering the initial chroma value with the Kalman filtering algorithm comprises:
    calculating an average reconstructed value of the reconstructed values of the attribute information of the one or more points preceding the target point;
    converting the average reconstructed value into an average luma value and an average chroma value; and
    obtaining the final chroma value by using the average chroma value as the measurement value and filtering the initial chroma value with the Kalman filtering algorithm.

2. The method of claim 1, wherein the one or more points preceding the target point are one or more points which precede the target point in a decoding order.

3. The method of claim 1, wherein a residual value of the attribute information of the target point is obtained by performing inverse quantization based on a target quantization step size among a plurality of quantization step sizes, and converting the initial reconstructed value into the initial luma value and the initial chroma value comprises:
    converting the initial reconstructed value into the initial luma value and the initial chroma value, when the target quantization step size is greater than or equal to a threshold N, wherein N is a non-negative integer.

4. The method of claim 3, wherein the plurality of quantization step sizes are sorted in an ascending order, N is a value of an n-th quantization step size in the plurality of quantization step sizes, and n is a positive integer.

5. The method of claim 1, wherein converting the initial reconstructed value into the initial luma value and the initial chroma value comprises:
    converting the initial reconstructed value into the initial luma value and the initial chroma value with a color space conversion function, wherein the initial luma value and the initial chroma value are in a color space supported by a display screen.

6. The method of claim 1, wherein parsing the bitstream of the point cloud to obtain the initial reconstructed value of the attribute information of the target point in the point cloud comprises:
    when a number of points in one level of detail (LOD) layer of the point cloud is less than a threshold M, for each point in the LOD layer, obtaining an initial reconstructed value of attribute information of the point based on a residual value of the attribute information of the point and a predicted value of the attribute information of the point in lossless encoding; or
    when the number of points in one LOD layer of the point cloud is greater than or equal to the threshold M, for an (m*M)-th point in the LOD layer, obtaining an initial reconstructed value of attribute information of the point based on a residual value of the attribute information of the point and a predicted value of the attribute information of the point in lossless encoding, wherein M is a positive integer greater than 1 and m is a positive integer greater than 0.

7. The method of claim 6, further comprising:
    parsing the bitstream to obtain the number of points in the bitstream of which residual values of attribute information do not require inverse quantization.

8. The method of claim 1, wherein parsing the bitstream of the point cloud to obtain the initial reconstructed value of the attribute information of the target point in the point cloud comprises:
    when a number of points in one LOD layer of the point cloud is less than a threshold T, for each point in the LOD layer, replacing a final reconstructed value of attribute information of the point with an actual value of the attribute information of the point; or
    when the number of points in one LOD layer of the point cloud is greater than or equal to the threshold T, for a (t*T)-th point in the LOD layer, replacing a final reconstructed value of attribute information of the point with an actual value of the attribute information of the point, wherein T is a positive integer greater than 1 and t is a positive integer greater than 0.

9. The method of claim 8, further comprising:
    parsing the bitstream to obtain the number of points in the bitstream of which final reconstructed values of attribute information are actual values and obtain the actual values of the attribute information of the points.

10. The method of claim 1, further comprising:
    partitioning the point cloud into one or more LOD layers, wherein each LOD layer comprises one or more points.

11. The method of claim 1, wherein parsing the bitstream of the point cloud to obtain the initial reconstructed value of the attribute information of the target point in the point cloud comprises:
  parsing the bitstream to obtain reconstruction information of position information of the target point;
  obtaining a predicted value of the attribute information of the target point according to the reconstruction information of the position information of the target point;
  parsing the bitstream to obtain a residual value of the attribute information of the target point; and
  obtaining the initial reconstructed value of the attribute information of the target point according to the predicted value of the attribute information of the target point and the residual value of the attribute information of the target point.

12. A point cloud encoding method, performed by an encoder and comprising:
  processing position information of a target point in a point cloud to obtain reconstruction information of the position information of the target point;
  obtaining a predicted value of attribute information of the target point according to the reconstruction information of the position information of the target point;
  processing the attribute information of the target point in the point cloud to obtain an actual value of the attribute information of the target point;
  obtaining a residual value of the attribute information of the target point according to the predicted value of the attribute information of the target point and the actual value of the attribute information of the target point; and
  obtaining a bitstream by encoding a number of residual values of attribute information of points in lossless encoding and the residual value of the attribute information of the target point that require to be signalled into the bitstream.

13. The method of claim 12, wherein obtaining the bitstream by encoding the number of the residual values of the attribute information of the points in lossless encoding and the residual value of the attribute information of the target point that require to be signalled into the bitstream comprises:
  when a number of points in one level of detail (LOD) layer of the point cloud is less than a threshold M, for each point in the LOD layer, obtaining the bitstream by encoding a residual value of attribute information of a point not subject to inverse quantization; or
  when the number of points in one LOD layer of the point cloud is greater than or equal to the threshold M, for an (m*M)-th point in the LOD layer, obtaining the bitstream by encoding a residual value of attribute information of a point not subject to inverse quantization, wherein M is a positive integer greater than 1 and m is a positive integer greater than or equal to 0.

14. The method of claim 12, further comprising:
  partitioning the point cloud into one or more LOD layers, wherein each LOD layer comprises one or more points.

15. A non-transitory computer-readable storage medium storing a bitstream, the bitstream being generated according to the following:
  processing position information of a target point in a point cloud to obtain reconstruction information of the position information of the target point;
  obtaining a predicted value of attribute information of the target point according to the reconstruction information of the position information of the target point;
  processing the attribute information of the target point in the point cloud to obtain an actual value of the attribute information of the target point;
  obtaining a residual value of the attribute information of the target point according to the predicted value of the attribute information of the target point and the actual value of the attribute information of the target point; and
  obtaining the bitstream by encoding a number of residual values of attribute information of points in lossless encoding and the residual value of the attribute information of the target point that require to be signalled into the bitstream.

16. The non-transitory computer-readable storage medium of claim 15, wherein obtaining the bitstream by encoding the number of the residual values of the attribute information of the points in lossless encoding and the residual value of the attribute information of the target point that require to be signalled into the bitstream comprises:
  when a number of points in one level of detail (LOD) layer of the point cloud is less than a threshold M, for each point in the LOD layer, obtaining the bitstream by encoding a residual value of attribute information of a point not subject to inverse quantization; or
  when the number of points in one LOD layer of the point cloud is greater than or equal to the threshold M, for an (m*M)-th point in the LOD layer, obtaining the bitstream by encoding a residual value of attribute information of a point not subject to inverse quantization, wherein M is a positive integer greater than 1 and m is a positive integer greater than or equal to 0.

17. The non-transitory computer-readable storage medium decoder of claim 15, further comprising:
  partitioning the point cloud into one or more LOD layers, wherein each LOD layer comprises one or more points.

* * * * *